United States Patent [19] [11] 4,230,775
Derick et al. [45] Oct. 28, 1980

[54] POLYVINYL BUTYRAL INK FORMULATION

[75] Inventors: Burton N. Derick, Mineralwells, W. Va.; Robert E. Moynihan, Lowell, Ohio; Jon W. Wolfe, Matthews, N.C.

[73] Assignee: E. I. Du Pont de Nemours and Company, Wilmington, Del.

[21] Appl. No.: 861,568

[22] Filed: Dec. 16, 1977

[51] Int. Cl.³ ............................................. B32B 27/06
[52] U.S. Cl. .............................. 428/525; 260/30.4 R; 260/32.6 R; 260/32.8 R; 260/37 P; 260/42.21; 260/42.51; 427/211; 427/280; 525/56
[58] Field of Search ............... 260/73 L, 42.51, 42.21, 260/32.8 R, 32.6 R, 30.4 R; 427/211, 280; 428/525 T; 106/20; 526/9, 10, 11; 525/56

[56] References Cited
U.S. PATENT DOCUMENTS

| 2,526,728 | 10/1950 | Burk | 154/2.7 |
| 2,739,080 | 3/1956 | Woodworth | 260/32.8 R |
| 3,437,552 | 4/1969 | Bower | 260/73 |
| 3,591,406 | 7/1971 | Moynihan | 428/409 |
| 3,591,406 | 6/1971 | Moynihan | 8/4 |

FOREIGN PATENT DOCUMENTS 49-36840 of 1974 Japan ...................................... 260/73 L Primary Examiner—J. Ziegler

[57] ABSTRACT

Ink formulation based on polyvinyl butyral and useful for printing polyvinyl butyral sheeting provides both improved blocking and improved glass adhesion through increased hydroxyl content in the polyvinyl butyral of the ink formulation.

1 Claim, No Drawings

POLYVINYL BUTYRAL INK FORMULATION

BACKGROUND OF THE INVENTION

Polyvinyl butyral sheeting has been used for many years as an interlayer for glass laminates. When such laminates are subjected to an impact sufficient to fracture the glass sheets, the interlayer absorbs the energy of impact and prevents the shattering of the laminate.

A major application for these safety glass laminates is automotive windshields. In this application, it is generally desired to print a tinted gradient band on the polyvinyl butyral interlayer. For compatability with the interlayer, a printing ink is often used which is based on solvent, polyvinyl butyral and the desired dyes. A particularly satisfactory printing technique is described in Moynihan, U.S. Pat. No. 3,591,406.

With the use of such printing inks, it has been found that the tinted gradient band tends to adhere to adjacent sheeting during handling. In addition to this problem, known as blocking, adhesion of the tinted gradient band to the glass in finished laminates is less than the adhesion of the unprinted portion. This results in imperfections in glass laminates prepared from the sheeting.

SUMMARY OF THE INVENTION

The instant invention provides an improved polyvinyl butyral ink formulation which reduces blocking between polyvinyl butyral sheets and increases adhesion of tinted gradient bands to glass in safety glass laminates.

Specifically, the present invention provides an improvement in printing ink comprising unplasticized polyvinyl butyral, dye and solvent, which improvement comprises unplasticized polyvinyl butyral having a hydroxyl content of about from 29 to 35 weight percent.

The invention further provides an improvement in the process for printing polyvinyl butyral sheeting by applying to the sheeting an ink comprising solvent, dye and unplasticized polyvinyl butyral, which improvement comprises an unplasticized polyvinyl butyral in the ink having a hydroxyl content of about from 5 to 50 percent higher than the hydroxyl content of the polyvinyl butyral resin in the sheeting.

DETAILED DESCRIPTION OF THE INVENTION

The polyvinyl butyral used in the present invention is prepared by the usual condensation of high molecular weight polyvinyl alcohol and n-butyralaldehyde. The hydroxyl content, as recognized by those skilled in the art, varies according to the amount of n-butyraladehyde reacted with the polyvinyl alcohol.

The hydroxyl content of the polyvinyl butyral resin is calculated as polyvinyl alcohol and this hydroxyl content may be determined by the following procedure: 1.000 gram of the polyvinyl butyral resin to be analyzed is dissolved in 25 milliliters of a solution containing, by weight, 88 parts pyridine and 12 parts acetic acid, and the solution placed in a bottle which is then sealed and heated in a boiling water bath for 1½ hours and then cooled. To the cooled solution there are added 20 drops of phenolphthalein indicator solution and 100 milliliters of 0.3 normal sodium hydroxide solution, and the bottle sides washed with 100 milliliters of methyl isobutyl ketone. The sample is then titrated with 0.3 normal sodium hydroxide to the phenolphthalein end point. A blank containing no resin is run under identical conditions and titrated as above, and the polyvinyl butyral resin hydroxyl content calculated as percent polyvinyl alcohol is determined as follows:

Hydroxyl content (weight % polyvinyl alcohol)=1.32[milliliters for blank-milliliters for sample]

It has been discovered that polyvinyl butyral sheeting printed with the ink formulations of the present invention exhibits markedly reduced blocking combined with improved glass adhesion in the tinted gradient band when the hydroxyl content of the polyvinyl butyral used in printing ink is about from 29 to 35 weight % as determined by the above technique. With respect to the polyvinyl butyral sheeting which is the substrate for the printing ink, the hydroxyl content of the polyvinyl butyral used in the ink should be about from 5–50% greater than the hydroxyl content of the sheeting. Below these minimal hydroxyl content percentages, the benefits of the present invention will be realized to a substantially lesser degree. When the hydroxyl contents exceed the maximums specified above, variations in the properties between the tinted and untinted portions of the polyvinyl butyral sheeting are likely to result in deterioration of the performance characteristics of the final laminated product.

The ink used in this invention generally comprises an organic solvent solution of dye and polyvinyl butyral. The dye should be colorfast in the sheeting and soluble in the particular solvent used in the ink. Suitable dyes and solvents include those disclosed in U.S. Pat. No. 2,739,080 to Woodworth, which is hereby incorporated by reference. Other dyes meeting the light stability and solubility requirements can be used. Generally, the suitable dyes fall within the group of azo and anthraquinone dyes. Other solvents can be used so long as they will dissolve the dye selected and the amount of polyvinyl butyral to be used in the ink. The solvent should also be chemically inert to these materials as well as to the sheeting, and should have sufficiently high surface tension so as to not spread out on the uneven surface of the sheeting and cause agglomeration. The solvent should also have volatility so as to dry as rapidly as possible in order to prevent the dots of ink formed in the printing process for agglomerating. Preferred solvents which can be used in the instant invention are cyclohexanone, n-methyl pyrrolidone and dimethylformamide, of which dimethylformamide is particularly satisfactory.

The dye concentration in the ink will generally be about from 4 to 10 percent by weight based on the weight of the ink. The polyvinyl butyral is generally present in a concentration of about from 4 to 8 percent by weight, based on the weight of the ink.

The present ink formulations are useful for the printing of plasticized polyvinyl butyral sheeting according to standard printing techniques. The present inks are particularly beneficial in the two-sided printing techniques described in Moynihan U.S. Pat. No. 3,591,406.

The tinted polyvinyl butyral sheeting resulting from the present invention exhibits markedly improved blocking performance over sheeting prepared with printing ink having a normal polyvinyl butyral hydroxyl content of about 23%. Moreover, when fabricated into glass laminates, sheeting printed with the present formulations exhibits improved adhesion to the glass in the printed region.

The invention is further illustrated by the following specific examples, in which parts and percentages are by weight unless otherwise indicated.

In these examples, the adhesion of the samples to glass was measured by the following procedure. For each test, five square one inch by one inch specimens are cut from PVB/glass laminate with a water-cooled glass cutoff saw with a diamond or carborumdum blade. The area of each specimen is measured to the nearest 0.001 inch. Each specimen is held at a 45° angle to a supporting table in a compression testing machine and a compressive force is applied to the sample at the rate of 0.1 inch per minute. The force required to break the bond between the glass and the interlayer is recorded and the compressive shear strength is calculated according to the formula:

$$\text{Compressive shear strength (psi)} = \frac{\text{Force (pounds) required to break bond}}{\text{Area of sample to 0.001 square inch}}$$

The average for the five specimens is reported for the sample.

In the Examples, Blocking characteristics are measured as follows:

I. Apparatus (Equivalent apparatus may be substituted.)
1. Blocking weights made from suitable lead stock of a thickness to give a total weight of 9.0±0.2 lb (blocking weights, loading blocks and rubber spacer) with dimensions of 2.5 in×9 in.
2. Instron Tensile Tester, any model capable of running at a crosshead speed of 20 in./minute with a 20-in. return; Instron Engineering Corp., Canton, Mass.
3. Instron Automatic Integrator, 1 or 2 counter model; Instron Engineering Corp.
4. Loading blocks made from ground-steel stock ⅜ in. thick with dimensions of 2.5 in.×9 in.
5. Specimen cutting template, 2.5 in.×10 in.
6. Timer, capable of timing within 0.1 second
7. Rubber spacer, 2.5 in.×9 in.×0.5 in. foam rubber
8. Oven, air-circulating, capable of maintaining 71°±2° C.

II. Procedure

A. Sample Preparation
1. Obtain a 12-in. square sample of sheeting marked for extrusion and transverse directions and taken from the center of the sheeting roll.
2. Place the sheet on an aluminum tray in an air-circulating oven at 71°±2° C. for 30±5 minutes.
3. Cut four 2.5 in.×10 in. specimens from the sheet with the long dimension in the transverse direction. (Inscribe identification on one end of sample.)
4. Wash the sodium bicarbonate from the sheeting samples with water.
5. Attach the samples to wooden rods and place in a conditioned atmosphere controlled to 20° C. and a maximum relative humidity of 23±2% for 8±0.2 hours.
6. Place two specimens together, mating the surfaces to be tested as required with the identification at the same end.
7. Separate each set of specimens with heavy kraft paper of equal dimensions (2.5 in.×10 in.).

B. Blocking
8. Stack the specimens on a load block no greater than 20 pairs high in a 20°±1° C. and 23±2% relative humidity atmosphere. (All inscribed ends must be on the same end of the stack.)
9. Place the rubber spacer on top of the stack, aligning the edges properly. (Pad is 9 in. long, the 1-in. inscribed ends are not loaded.)
10. Place the steel loading blocks and lead weights on top of the rubber pad.
[The loading blocks of 9.0 lb (lead weight plus steel weight plus rubber weight) distribute a load of 0.4 psi, neglecting the pressure due to stacking.]
11. Allow the load to remain on the samples for 24±1 hours in the conditioned atmosphere (20° C. and 23±2% RH).

C. Equipment Set-Up
12. Set up the Instron tester with a crosshead speed of 20 in. per minute, a "B" load cell for 1, 2, or 4-lb load, GAGE set at 1 in., RETURN at 22 in. Turn the integrator ON, and allow to warm up 5 minutes in the MANUAL position.
(The chart on the instron tester may be set up with a speed of 5 in./minute, but is not required for calculation. It is only used to indicate the type of curve from which the area is calculated by the integrator.)
13. Calibrate the tester to obtain a full-scale reading on the chart with a 1-lb load and the FULL-SCALE LOAD setting at 5.
14. Calibrate the Instron integrator by first having the pen at the zero line on the tester (no load); then adjust the ZERO control on the integrator until the strobe disk viewed through small window in upper right-hand panel of unit is stationary. (Pressing the pushbutton next to window will operate a small internal neon lamp.) After ajustment has been made, lock ZERO knob in place by holding it in place with one hand and, with the other, rotate the knurled ring clockwise until it is firmly sealed.
15. After the zero adjustment has been completed, obtain a full-scale deflect on the tester chart by placing a 1-lb load on the upper clamp. Now, using the CALIBRATION CONTROL knob, obtain a stationary pattern on the strobe disk which is observed through the window with the pushbutton pressed.
16. As a final check, with a full-scale deflection on the tester chart, start a stopwatch and integrator counter simultaneously. After 1.0±0.1 minute, stop the counter. The counter should read 5000±25; if it does not, repeat steps 13 to 15.

D. Testing

Testing is performed at 23% RH and 20° C., and within 1 to 4 hours after removal of blocking load.
17. Peel the scribed ends of a set of specimens ca. 1 in. apart, and attach one sheet to the upper clamp and the other sheet to the bottom clamp. (Pen should be OFF when mounting or removing samples from clamps.)
18. Zero the integrator counter and turn tester pen ON.
19. Push the START button of the tester, and allow the crossheads to proceed downward, peeling the specimen apart. As the first ½ inch of specimen is peeled, check that the tester recorder pen does not go off-scale; if it should, switch to a FULLSCALE LOAD setting of 10 (2-lb full-scale) or 20 (4-lb full-scale).

20. After the first ½ inch of sheeting has peeled, start the timer and integrator counter simultaneously. (Should the recorder go off-scale during the integrating period, discard the results and run the other sample at a higher FULL-SCALE LOAD setting.)
21. Stop the timer and integrator ca. 35-40 seconds later or just before peeling is completed, whichever is the shortest. Record time, integrator reading and full-scale load (1, 2, or 4 lb full-scale).
22. Each sample is run in duplicate, unless first sample goes off-scale during peeling operation.
23. After each sample is removed from clamps, check that Instron tester chart zero has not shifted.
24. After each set of duplicates has been completed, repeat step 16 to insure that the integrator is still in calibration.

III. Calculations
1. Blocking, millipounds/in. width $$\frac{4.8 \times L \times I}{T}$$

where:
L = full-scale load, step 13 or 19
I = integrator value, step 21
T = time in seconds, step 21
4.8 = integrator constant for converting to millipounds
2. Report the average of duplicates.

EXAMPLE 1 AND COMPARATIVE EXAMPLES A AND B

Polyvinyl butyral (PVB) flake having hydroxyl levels of 29.4%, 22.4% and 26.6%, measured as described above, were dissolved in dimethyl formamide (DMF) in Examples 1, A and B, respectively, the proportions of 14.5 gm DMF per 1 gm PVB with the DMF adjusted to achieve a room temperature viscosity of the solution of 90 cp. To 155 gm of this dope was added 0.308 gm Solvent Blue No. 36, 5.941 gm Solvent Yellow No. 16 and 4.259 gm Solvent Violet No. 11 dyes.

The three ink formulations were printed on standard BUTACITE®-106 PVB sheeting by proof press. Printing was on one side only.

Blocking tests were performed on the PVB sheeting, printed side to printed side, and adhesion tests were performed on glass washed prior to lamination in demineralized and 350 ppm hardness water. The demineralized water wash generally results in high adhesion while the hard water wash generally results in lower adhesion. The test results were as follows:

| Example | Printing Ink PVB Hydroxyl (%) | Printed Region Blocking ($10^{-3}$ pounds/inch) | CSS Adhesion (psi) @ .50% $H_2O$ Demin. | 350 ppm |
|---|---|---|---|---|
| Control A | 22.4 | 68.0 | 1388 | 940 |
| Control B | 26.6 | 55.8 | 1392 | 995 |
| 1 | 29.4 | 39.0 | 1700 | 925 |

The printed sheeting of the present invention produced significantly reduced blocking and increased adhesion under high adhesion conditions. Under low adhesion conditions in these experiments, no significant change in adhesion resulted with increased hydroxyl content.

EXAMPLES 2-5 TO COMPARATIVE EXAMPLES C and F

In Examples 2-5 a printing ink was prepared as in Example 1. This ink was then two-side printed as a gradient band on polyvinyl butyral sheeting having a hydroxyl content of about 22.8%, using the technique of Moynihan, U.S. Pat. No. 3,591,406. Four commercial size rolls, having a 7-in. gradient band, were produced using standard commercial techniques.

In Comparative Examples C-F, four samples of two-side printed sheeting were tested in which the hydroxyl content of the polyvinyl butyral in both the sheeting and the printing ink was 22.8%.

Adhesion and blocking tests were performed on each of the samples, and the results are summarized below:

| Example | Blocking ($10^{-3}$ pounds/inch) Clear Region | Gradient Band | CSS Adhesion Demin. Gradient | Clear | Ratio* | Average Ratio | 350 ppm Gradient | Clear | Ratio* | Av. |
|---|---|---|---|---|---|---|---|---|---|---|
| 2 | 128 | 104 | 2061 | 2013 | 0.92 | | 1102 | 919 | 1.20 | |
| 3 | 81 | 56 | 2226 | 2382 | 0.93 | 0.97 | 1188 | 993 | 1.20 | 1.15 |
| 4 | 126 | 97 | 2158 | 2436 | 0.89 | | 1207 | 1134 | 1.06 | |
| 5 | 82 | 62 | 2228 | 2155 | 1.03 | | 1192 | 1038 | 1.15 | |
| Comparative C | 89.0 | 132.3 | 1517 | 1727 | 0.88 | | 763 | 826 | 0.92 | |
| Comparative D | 90.5 | 139.0 | 1415 | 1538 | 0.92 | 0.88 | 974 | 946 | 1.03 | 0.96 |
| Comparative E | 91.5 | 130.5 | 1377 | 1673 | 0.82 | | 957 | 918 | 1.04 | |
| Comparative F | 93.8 | 147.3 | 1384 | 1576 | 0.88 | | 822 | 971 | 1.85 | |

*Adhesion of Gradient Band Region/Adhesion of Clear Region

We claim:
1. In a printing ink comprising unplasticized polyvinyl butyral, dye and solvent, the improvement which comprises unplasticized polyvinyl butyral having a hydroxyl content of about from 29 to 35 weight percent.

* * * * *